United States Patent
Fujikane et al.

(10) Patent No.: US 8,640,839 B2
(45) Date of Patent: Feb. 4, 2014

(54) CONTROL DEVICE FOR VEHICULAR POWER TRANSMITTING SYSTEM AND CORRESPONDING METHOD

(75) Inventors: Tsuyoshi Fujikane, Toyota (JP); Kazuyuki Shiiba, Toyota (JP); Hiromitsu Metsugi, Toyota (JP); Hiroki Takeda, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 286 days.

(21) Appl. No.: 13/133,306

(22) PCT Filed: Nov. 12, 2009

(86) PCT No.: PCT/IB2009/007423
§ 371 (c)(1),
(2), (4) Date: Jun. 7, 2011

(87) PCT Pub. No.: WO2010/067152
PCT Pub. Date: Jun. 17, 2010

(65) Prior Publication Data
US 2011/0240428 A1 Oct. 6, 2011

(30) Foreign Application Priority Data

Dec. 8, 2008 (JP) ................................. 2008-312763

(51) Int. Cl.
*F16H 61/50* (2006.01)
*F16D 33/02* (2006.01)

(52) U.S. Cl.
USPC .................... 192/3.24; 192/3.26; 477/176

(58) Field of Classification Search
None
See application file for complete search history.

(56) References Cited

U.S. PATENT DOCUMENTS

| 3,382,855 A | 5/1968 | Glamann |
| 4,828,082 A * | 5/1989 | Brand et al. ................... 192/3.3 |
| 2004/0157701 A1 | 8/2004 | Legner |
| 2004/0242360 A1* | 12/2004 | Nakayashiki et al. ........ 475/120 |

FOREIGN PATENT DOCUMENTS

| JP | 61-036759 U | 3/1986 |
| JP | 01-169170 A | 7/1989 |
| JP | 02-245561 A | 1/1990 |

OTHER PUBLICATIONS

International Search Report and Written Opinion for corresponding International Patent Application No. PCT/IB2009/007423 mailed Mar. 17, 2010.
International Preliminary Report on Patentability for corresponding International Patent Application No. PCT/IB2009/007423 mailed Dec. 21, 2010.

* cited by examiner

*Primary Examiner* — David D Le
*Assistant Examiner* — Mark Manley
(74) *Attorney, Agent, or Firm* — Sughrue Mion, PLLC

(57) ABSTRACT

A control device for a vehicular power transmitting system including a torque converter (6) having a pump impeller (6p), a turbine wheel (6t), a stator wheel (6s) rotatably disposed between the turbine wheel and the pump impeller, and a lock-up clutch (L/U) includes a capacity coefficient control unit (126) that controls a capacity coefficient of the torque converter by controlling rotation of the stator wheel, and the capacity coefficient control unit increases the capacity coefficient of the torque converter based on an amount of heat generated during slip control of the lock-up clutch.

12 Claims, 11 Drawing Sheets

FIG.3

|       | C1 | C2 | C3 | C4 | B1 | B2  | F1 |
|-------|----|----|----|----|----|-----|----|
| P     |    |    |    |    |    |     |    |
| Rev1  |    |    | ○  |    |    | ○   |    |
| Rev2  |    |    |    | ○  |    | ○   |    |
| N     |    |    |    |    |    |     |    |
| 1st   | ○  |    |    |    |    | (○) | ○  |
| 2nd   | ○  |    |    |    | ○  |     |    |
| 3rd   | ○  |    | ○  |    |    |     |    |
| 4th   | ○  |    |    | ○  |    |     |    |
| 5th   | ○  | ○  |    |    |    |     |    |
| 6th   |    | ○  |    | ○  |    |     |    |
| 7th   |    | ○  | ○  |    |    |     |    |
| 8th   |    | ○  |    |    | ○  |     |    |

○ : ENGAGED
(○) : ENGAGED WHEN ENGINE BRAKE IS APPLIED

CONTROL DEVICE FOR VEHICULAR POWER TRANSMITTING SYSTEM AND CORRESPONDING METHOD

FIELD OF THE INVENTION

The invention relates to a control device for a vehicular power transmitting system including a torque converter having a lock-up clutch, and more particularly to control for expanding a range of a slip control region of the lock-up clutch.

BACKGROUND OF THE INVENTION

A torque converter having a pump impeller, a turbine wheel, and a stator wheel rotatably disposed between the turbine wheel and the pump impeller is well known in the art. In the toque converter, the stator wheel is coupled to a non-rotary member via a one-way clutch, and the capacity of the torque converter is not variable. Generally, it is desired that the torque converter has a high capacity (capacity coefficient) as its fluid characteristic when it aims at improving the fuel efficiency or reducing fuel consumption. With the above arrangement, however, the capacity of the torque converter is uniquely determined based on the shapes of the pump impeller, turbine wheel and the stator wheel, and the torque, converter exhibits the same fluid characteristics irrespective of the running pattern of the vehicle. Thus, there is a limit to the concurrent improvements of the fuel efficiency and the driving performance.

When the capacity coefficient of the torque converter is high, for example, a difference between the rotational speed of the pump impeller (i.e., the rotational speed of the internal combustion engine) and the rotational speed of the turbine wheel is small. Therefore, if the driver depresses the accelerator pedal while the vehicle is running in a steady state, so as to accelerate the vehicle, the rotational speed of the turbine wheel is not raised unless the transmission is shifted down, and therefore, the driving force cannot be rapidly generated. Thus, where a torque converter having a high capacity is employed, the internal combustion engine is required to be operated in a high-speed low-load region even during steady-state running so that required torque is easily produced when the accelerator pedal is depressed. When the capacity coefficient of the torque converter is low, on the other hand, a difference between the rotational speed of the pump impeller and the rotational speed of the turbine wheel is large; therefore, the response to the depression of the accelerator pedal is improved. In this case, however, a difference between the rotational speed of the pump impeller (pump speed) and the rotational speed of the turbine wheel (turbine speed) is large even during steady-state running of the vehicle, and the internal loss of the torque converter is increased.

In the meantime, a variable capacity type torque converter as described in, for example, Japanese Patent Application Publication No. 01-169170 (JP-A-01-169170) is provided with braking means between the stator wheel and the non-rotary member, and is operable to make its capacity variable by controlling braking torque of the braking means. The control of the braking torque with the braking means makes it possible to change the torque ratio and capacity coefficient of the torque converter continuously (steplessly) or in multiple steps, and the optimum torque ratio and capacity coefficient can be established according to the operating conditions or running conditions, thus assuring improved running performance of the vehicle.

In recent years, the torque converter includes a lock-up clutch engageable to couple the turbine wheel and the pump impeller. By engaging the lock-up clutch when appropriate, the power transmission efficiency of the torque converter is improved. In addition, slip control (flex lock-up control) of the lock-up clutch may be implemented under which a slight slip is caused to occur in the lock-up clutch, so as to enable the lock-up clutch to operate in a wide running or operating region of the vehicle.

If the running region in which the above-mentioned slip control is effected is expanded, the fuel economy or efficiency is generally improved. However, if the slip control is effected in a running region in which the input torque transmitted to the lock-up clutch is large, for example, the amount of heat generated from the lock-up clutch is increased, resulting in a problem of reduction in the durability of the lock-up clutch. In view of this problem, it may be proposed to suppress or prevent the increase of the generated heat amount by reducing a slip amount (a difference in the rotational speed between the turbine wheel and the pump impeller) of the slip control. If the slip amount is reduced, however, a vibration damping effect inherently provided by the torque converter is reduced, which may result in an increase of the booming noise. Thus, the expansion of the slip control region of the lock-up clutch is limited so as to prevent the increase in the generated heat amount of the lock-up clutch and the reduction in the durability.

SUMMARY OF THE INVENTION

The present invention provides a control device for a vehicular power transmitting system including a torque converter having a lock-up clutch, more specifically, a control device that is able to expand a slip control region of the lock-up clutch while holding down the amount of heat generated from the lock-up clutch.

A first aspect of the invention is concerned with a control device for a vehicular power transmitting system. The vehicular power transmitting system includes a torque converter having a pump impeller, a turbine wheel, a stator wheel rotatably disposed between the turbine wheel and the pump impeller, and a lock-up clutch. The control device according to the first aspect of the invention includes a capacity coefficient control unit that controls a capacity coefficient of the torque converter by controlling rotation of the stator wheel. The capacity coefficient control unit increases the capacity coefficient of the torque converter based on an amount of heat generated during slip control of the lock-up clutch.

In the control device according to the first aspect of the invention, the capacity coefficient control unit increases the capacity coefficient of the torque converter based on the amount of heat generated during slip control of the lock-up clutch, so as to reduce torque assigned to the lock-up clutch (i.e., torque to be transferred by the lock-up clutch) and suppress or avoid increase in the amount of heat generated in the lock-up clutch. Accordingly, the slip control is easily implemented in a running region in which the slip control was difficult to carry out as the amount of heat generated in the lock-up clutch increases. Thus, the running region in which the slip control is effected can be expanded, which leads to an improvement in the fuel efficiency.

The control device as described above may further include a generated heat amount calculating unit that calculates the amount of heat generated during slip control of the lock-up clutch. Also, the capacity coefficient control unit may control the capacity coefficient so that the generated heat amount calculated by the generated heat amount calculating unit becomes equal to or smaller than a predetermined value.

With the control device as described above, the amount of heat generated during slip control of the lock-up clutch is reduced or prevented from increasing, and therefore, the slip control region can be expanded.

The generated heat amount calculating unit may calculate assigned torque to be transferred by the lock-up clutch, from input torque of a driving source and transmitted torque of the torque converter, and may calculate the generated heat amount based on the assigned torque and a slip amount of the lock-up clutch.

With the control device as described above, the generated heat amount of the lock-up clutch can be sequentially calculated with high accuracy.

The assigned torque to be transferred by the lock-up clutch may be a difference between the input torque and the transmitted torque.

The transmitted torque may be determined based on the rotational speed of the pump impeller and the capacity coefficient.

The slip amount may be determined based on a difference between the rotational speed of the pump impeller and the rotational speed of the turbine wheel.

The predetermined value may be set to a value determined in view of the durability of the lock-up clutch.

With the control device as described above, the slip control region of the lock-up clutch can be expanded while avoiding reduction in the durability of the lock-up clutch.

The capacity coefficient control unit may control the capacity coefficient by controlling rotation of the stator wheel, using an electric motor that is operatively coupled to the stator wheel such that power can be transmitted between the electric motor and the stator wheel.

With the control device as described above, the capacity coefficient can be changed as needed through the control of the rotational speed of the stator wheel by means of the electric motor.

The capacity coefficient control unit may cause the electric motor to rotate the stator wheel in a reverse direction so as to increase the capacity coefficient of the torque converter. In this manner, the capacity coefficient can be easily increased.

The vehicular power transmitting system may further include a clutch 10, that selectively couples the stator wheel and the electric motor, and a brake that selectively couples the stator wheel and a non-rotary member. The capacity coefficient control unit may control the clutch and the brake, based on the generated heat amount. With this arrangement, when the electric motor need not control rotation of the stator wheel, a power transmission path between the stator wheel and the electric motor may be cut off (i.e., the stator wheel and the electric motor may be disconnected from each other). Also, the stator wheel may be coupled to the non-rotary member when appropriate, so that the torque converter operates in substantially the same manner as the torque converter of the related art. In a torque converter range, for example, the stator wheel is inhibited from rotating so as to amplify or increase the torque. In a coupling range, on the other hand, the braking means is released so as to rotate the stator wheel at idle, thereby to avoid reduction in the transmission efficiency clue to collision of hydraulic oil against the stator wheel.

Also, the vehicular power transmitting system may further include a clutch that selectively couples the electric motor and an output shaft of the torque converter. With this arrangement, when the electric motor is coupled to the output shaft of the torque converter, the electric motor is able to function as a driving source for driving the vehicle or regenerating electrical energy.

A second aspect of the invention is concerned with a method of controlling a vehicular power transmitting system. The vehicular power transmitting system includes a torque converter having a pump impeller, a turbine wheel, a stator wheel rotatably disposed between the turbine wheel and the pump impeller, and a lock-up clutch. The method of controlling the vehicular power transmitting system includes controlling a capacity coefficient of the torque converter by controlling rotation of the stator wheel, and increasing the capacity coefficient of the torque converter based on an amount of heat generated during slip control of the lock-up clutch.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is an operation table indicating an operating state of each engaging element (friction device) when each gear position is established in an automatic transmission shown in FIG. 1;

DETAILED DESCRIPTION OF THE EMBODIMENTS

Figure 1:
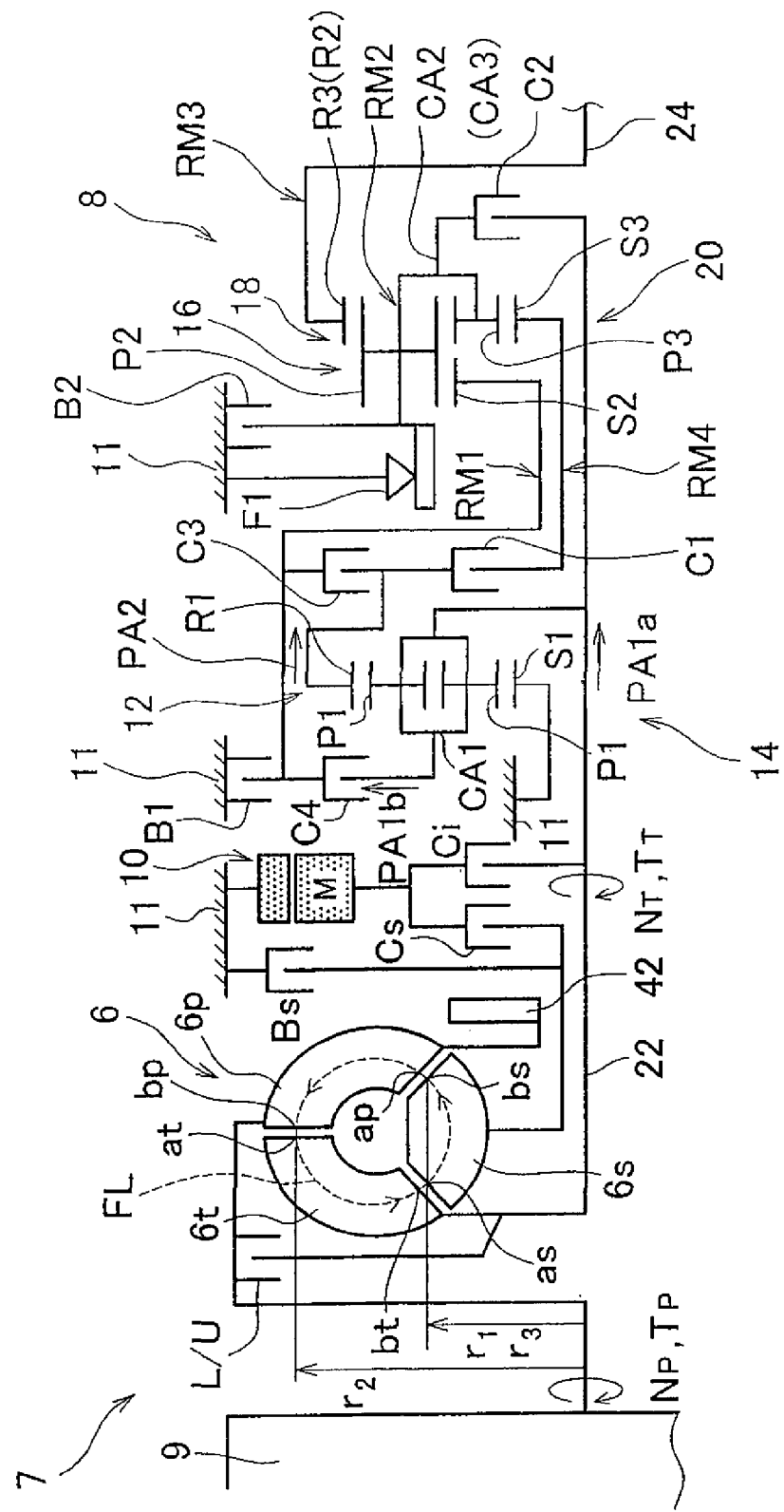
FIG. 1 is a skeleton diagram illustrating the construction of a vehicular driving system in which a torque converter according to one embodiment of the invention is used.

One embodiment of the invention will be described in detail with reference to the drawings. A system of the embodiment as described below is simplified or altered as needed in the drawings, and parts or components of the system are not necessarily depicted with accuracy in terms of the ratio of dimensions among the parts, shapes, and so forth.

FIG. 1 is a skeleton diagram of a vehicular power transmitting system 7 in which a torque converter 6 (variable capacity type torque converter) according to one embodiment of the invention is used. The vehicular power transmitting system 7 has a longitudinally-installed automatic transmission 8, and is favorably employed in a FR (front engine rear drive) vehicle. The vehicle having the power transmitting system 7 includes an engine 9 as a driving power source for running the vehicle. The output of the engine 9 in the form of an internal combustion engine is transmitted to right and left drive wheels, via a torque converter 6 that functions as a hydraulic power transmission device, automatic transmission 8, and a differential gear unit (final drive) and a pair of axles which are not illustrated.

The torque converter 6 is coupled to the crankshaft of the engine 9, and includes a pump impeller 6p that is rotated or driven by the engine 9 so as to produce fluid flow, i.e. flow of hydraulic oil in the torque converter 6, a turbine wheel 6t that is rotated when receiving the fluid flow from the pump impeller 6p, and a stator wheel 6s that is rotatably disposed in the midst of the fluid flow from the turbine wheel 6t to the pump impeller 6p. The torque converter 6 is operable to transmit power via the hydraulic oil (fluid).

Also, a lock-up clutch L/U is provided between the pump impeller 6p and the turbine wheel 6t. The lock-up clutch L/U is controlled by a hydraulic control circuit 30 (which will be described later) to be selectively placed in an engaged state, a slipping state and a release state. When the lock-up clutch L/C is placed in a fully engaged state, the pump impeller 6p and the turbine wheel 6t are rotated as a unit, namely, the crankshaft of the engine 9 and an input shaft 22 of the automatic transmission 8 are directly coupled to each other.

The vehicular power transmitting system 7 further includes an electric motor 10 for rotating/driving the stator wheel Os of the torque converter 6, a clutch Cs provided in a power transmission path between the electric motor 10 and the stator wheel 6s for selectively connecting and disconnecting the electric motor 10 to and from the stator wheel 6s, a brake Bs for selectively connecting and disconnecting the stator wheel 6s to and from a transmission case (which will be referred to as "case") 11 as a stationary member, and a clutch Ci provided in a power transmission path between the electric motor 10 and the input shaft 22 for selectively connecting and disconnecting the electric motor 10 to and from the input shaft 22. The input shaft 22, which is coupled to the turbine wheel 6t, also functions as an output shaft of the torque converter 6.

When the clutch Cs is in the engaged state, the electric motor 10 may be driven to control the rotational speed of the stator wheel 6s in a positive rotational direction as the direction of rotation of the pump impeller 6p. In this operating mode, driving torque $T_D$ is applied to the stator wheel 6s in the above-mentioned positive rotational direction. As shown in FIG. 2 by way of example, the driving torque $T_D$ is proportional to the magnitude of driving current $I_D$ supplied to the electric motor 10 for rotation/driving thereof under control of an electronic control unit 78 (which will be described later). The electric motor 10 may also be driven to control the rotational speed of the stator 6s in a negative rotational direction. In this operating mode, driving torque $T_D$, which is proportional to the magnitude of driving current $I_D$ supplied to the electric motor 10, is applied to the stator wheel 6s in the negative rotational direction. The electric motor 10 corresponds to the electric motor of the present invention.

Figure 2A:
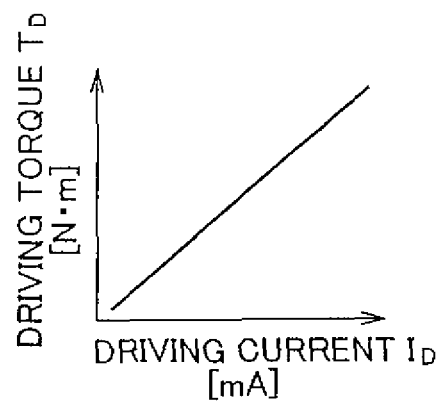
FIG. 2A is a view showing the relationship between driving current supplied to an electric motor of the torque converter of FIG. 1 and driving torque generated by the electric motor.
Figure 2B:
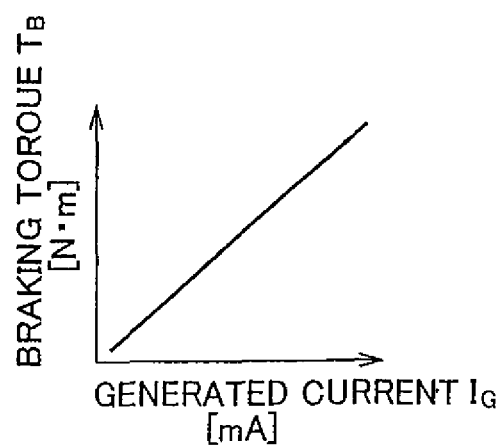
FIG. 2B is a view showing the relationship between generated current supplied to a storage device provided in the vehicle, and braking torque applied to a stator wheel.

The electric motor 10 is also operable through braking (regenerative braking) to control the rotational speed of the stator wheel 6s in a negative rotational direction opposite to the direction of rotation of the pump impeller 6p. In this operating mode, load torque or braking torque $T_B$ is applied to the stator wheel 6s in the negative rotational direction. As shown in FIG. 2B by way of example, the braking torque $T_B$ is proportional to the magnitude of generated current $I_G$ supplied to and stored in a storage device 50 (FIG. 8) provided in the vehicle.

When the clutch Ci is engaged, the electric motor 10 may be driven to control the rotational speed of the input shaft 22 in the positive rotational direction as the rotational direction of the input shaft 22. In this operating mode, too, driving torque $T_D$, which is proportional to the magnitude of driving current $I_D$ supplied to the electric motor 10 for rotation/driving under control of the electronic control circuit as shown in FIG. 2A, is applied to the input shaft 22 in the positive rotational direction. Also, the electric motor 10 is operable through braking (regenerative braking) to control the rotational direction of the input shaft 22. In this operating mode, too, load torques or braking (regenerative braking) torque $T_B$, which is proportional to the magnitude of generated current $I_G$ supplied to and stored in the storage device 50 provided in the vehicle as shown in FIG. 2B, is applied to the input shaft 22.

The clutches Cs, Ci and brake Bs are fluid-operated friction devices each including a hydraulic actuator and a multiple-disc clutch or brake that is engaged by friction or released with a hydraulic pressure supplied to the hydraulic actuator. When the brake Bs is fully engaged, the stator wheel 6s is fixed to the case 11 to be unable to rotate. When the degree of engagement of the brake Bs, or the engaging pressure of the brake Bs, is controlled so as to cause a slip to occur in the brake Bs, the stator wheel 6s is rotated in a negative rotational direction opposite to the positive rotational direction of the pump impeller 6p, relative to the pump impeller 6p that rotates in the positive rotational direction. In this operating mode, load torque or braking torque $T_B$, which increases as the above-mentioned engaging pressure increases, is applied to the stator 6s in the negative rotational direction. When the clutch Cs is engaged, the driving torque $T_D$ or braking toque $T_B$ produced by the electric motor 10 is transmitted as it is to the stator wheel 6s. If the degree of engagement of the clutch Cs, or the engaging pressure of the clutch Cs, is controlled so as to cause a slip to occur in the clutch Cs, the proportion of the driving torque $T_D$ or braking torque $T_B$ transmitted to the stator wheel 6s is changed in accordance with the magnitude of the engaging pressure. When the clutch Ci is engaged, the driving torque $T_D$ or braking torque $T_B$ produced by the electric motor 10 is transmitted as it is to the input shaft 22. When the degree of engagement of the clutch Ci, or the engaging pressure of the clutch Ci, is controlled so as to cause a slip to occur in the clutch Ci, the proportion of the driving torque $T_D$ or braking torque $T_B$ transmitted to the input shaft 22 is changed in accordance with the magnitude of the engaging pressure.

The automatic transmission 8, which is housed in the case 11 as a non-rotary member mounted on the vehicle body, has a first transmission unit 14 that consists principally of a first planetary gear set 12 of double pinion type and a second transmission unit 20 that consists principally of a second planetary gear set 16 of single pinion type and a third planetary gear set 18 of double pinion type. The first and second transmission units 14, 20 are arranged on the same or common axis. In operation, the automatic transmission 8 transmits rotation of the input shaft 22 to the output shaft 24 while changing the speed of rotation of the input shaft 22. The input shaft 22 also serves as a turbine shaft of the torque converter 6 which is rotated or driven by power of the engine 9 as a driving source for running the vehicle. It is to be noted that the torque converter 6 and the automatic transmission 8 are constructed substantially symmetrically with respect to the axis thereof, and the lower halves of the torque converter 6 and automatic transmission 8 are not illustrated in the skeleton diagram of FIG. 1.

The first planetary gear set 12 includes a sun gear S1, a plurality of pairs of pinion gears P1 that mesh with each other, a carrier CA1 that supports the pinion gears P1 such that the gears P1 can rotate about themselves and about the axis of the gear set 12, and a ring gear R1 that engages with the sun gear S1 via the pinion gears P1. The second planetary gear set 16 includes a sun gear S2, pinion gears P2, a carrier CA2 that supports the pinion gears P2 such that the gears P2 can rotate about themselves and about the axis of the gear set 16, and a ring gear R2 that engages with the sun gear S2 via the pinion gears P2. The third planetary, gear set 18 includes a sun gear S3, a plurality of pairs of pinion gears P2 and P3 that mesh with each other, a carrier CA3 that supports the pinion gears P2 and P3 such that the gears P2, P3 can rotate about themselves and about the axis of the gear set 18, and a ring gear R3 that engages with the sun gear S3, via the pinion gears P2 and P3.

Like the clutches Cs, Ci and brake Bs, clutches C1-C4 and brakes B1, B2 as shown in FIG. 1 are fluid-operated friction devices each including a hydraulic actuator and a multiple-disc clutch or brake that is engaged or released with a hydraulic pressure supplied to the hydraulic actuator.

A first rotary element RM1 (sun gear S2) is selectively coupled to the case 11 via the first brake B1 so that its rotation is stopped, and is selectively coupled via the third clutch C3 to the ring gear R1 (i.e., a second intermediate output path PA2) of the first planetary gear set 12 as an intermediate output member. The first rotary element RM1 (sun gear S2) is also selectively coupled via the fourth clutch C4 to the carrier CA1 (i.e., an indirect path PA1$b$ of a first intermediate output path PA1) of the first planetary gear set 12.

A second rotary element RM2 (carriers CA2 and CA3) is selectively coupled to the case 11 via the brake B2 so that its rotation is stopped, and is selectively coupled via the second clutch C2 to the input shaft 22 (i.e., a direct path PA1$a$ of the first intermediate output path PA1). A third rotary element RM3 (ring gears R2 and R3) is coupled integrally to the output shaft 24 for output of rotation. A fourth rotary element RM4 (sun gear S3) is coupled to the ring gear R1 via the first clutch C1. A one-way clutch F1, which allows the second rotary element RM2 to rotate in the positive rotation (i.e., in the same rotational direction as the input shaft 22) while inhibiting the same element RM2 from rotating in the reverse direction, is disposed in parallel with the second brake B2, between the second rotary element RM2 and the case 11.

FIG. 3 is a table indicating the operating state of each engaging device (i.e., clutch or brake) when each gear position is established in the automatic transmission 8. In FIG. 3, "O" denotes the engaged state, and "(O)" denotes the engaged state only when an engine brake is applied, while the blank space denotes the release state. As shown in FIG. 3, the engaging devices, i.e., the above-indicated plurality of fluid-operated friction devices (clutches C1 to C4 and brakes B1, B2) are selectively engaged or released, so that the automatic transmission 8 of this embodiment is placed in a selected one of a plurality of gear positions including eight forward-drive gear positions having different speed ratios (=the rotational speed $N_{IN}$ of the input shaft of the automatic transmission 8/the rotational speed $N_{OUT}$ of the output shaft of the automatic transmission 8). The speed ratio of each gear position is suitably determined or specified by the respective gear ratios $\rho 1$, $\rho 2$, $\rho 3$ of the first planetary gear set 12, second planetary gear set 16 and the third planetary gear set 18.

Figure 4:
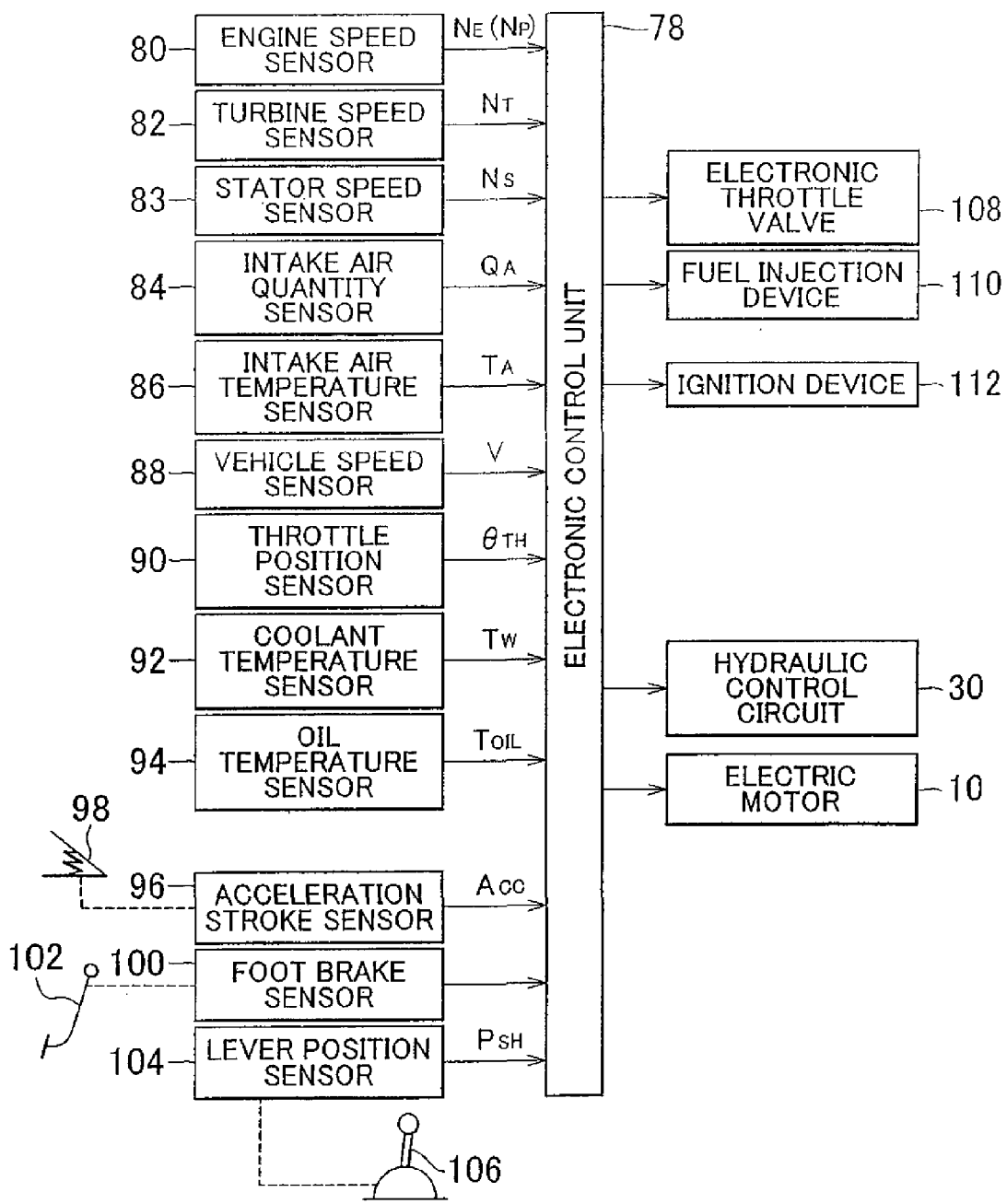
FIG. 4 is a block diagram illustrating a control system provided in the vehicle for controlling the engine, automatic transmission and torque converter of FIG. 1.

FIG. 4 is a block diagram illustrating a control system provided in the vehicle for controlling the engine 9, automatic transmission 8, and torque converter 6 (lock-up clutch L/U) of FIG. 1, for example. The electronic control unit 78 receives a signal indicative of the engine speed $N_E$, or the rotational speed $N_P$ of the pump impeller 6$p$, from an engine speed sensor 80, a signal indicative of the rotational speed $N_T$ of the turbine wheel 6$t$, or the input shaft speed $N_{IN}$, from a turbine speed sensor 82, and a signal indicative of the rotational speed $N_s$ of the stator wheel 6$s$ from a stator speed sensor 82. The electronic control unit 78 also receives a signal indicative of the intake air quantity $Q_A$ from an intake air quantity sensor 84, a signal indicative of the intake air temperature $T_A$ from an intake air temperature sensor 86, a signal indicative of the vehicle speed V, or the output shaft speed $N_{OUT}$, from a vehicle speed sensor 88, a signal indicative of the throttle opening $\theta_{TH}$ from a throttle position sensor 90, and a signal indicative of the coolant temperature $T_W$ from a coolant temperature sensor 92. The electronic control unit 78 further receives a signal indicative of the hydraulic oil temperature $T_{OIL}$ of the hydraulic control circuit 30 from an oil temperature sensor 94, a signal indicative of the amount of operation or stroke $A_{CC}$ of an accelerator pedal 98, or the like, from an acceleration stroke sensor 96, a signal indicative of the presence or absence of an operation of a foot brake (foot pedal) 102 as a service brake, from a foot brake switch 100, and a signal indicative of the lever position $P_{SH}$ to which a shift lever 106 is operated, from a lever position sensor 104.

The electronic control unit 78 includes a so-called microcomputer having CPU, RAM, ROM, input and output interface, and so forth. The CPU processes the above-indicated input signals according to programs stored in advance in the ROM, utilizing the temporary storage function of the RAM, and sends output signals to the electronic throttle valve 108, fuel injection device 110, ignition device 112, linear solenoid valves, etc. of the hydraulic control circuit 30, and the electric motor 10, for example. Through the input and output signal processing, the electronic control unit 78 performs output control of the engine 9, driving/regeneration control of the input shaft 22 through the use of the electric motor 10, shift control of the automatic transmission 8, rotation control of the stator wheel 6$s$ of the torque converter 6, and lock-up control of the lock-up clutch L/U, for example. The electronic control unit 78 is divided as needed into a sub-unit for use in engine control, a sub-unit for use in shift control, and so forth. In this embodiment, the output control of the engine 9 is effected by controlling the electronic throttle valve 108, fuel injection device 110, ignition device 112, and so forth.

The shift control of the automatic transmission 8 is effected by controlling the hydraulic control circuit 30. For example, a gear position to which the automatic transmission 8 is to be shifted is determined based on the actual accelerator pedal stroke Acc and the vehicle speed V, from a shift diagram (shift map) stored in advance, for example, and the engaged or release states of the clutches C1-C4 and brakes B1, B2 are changed according to the operation table shown in FIG. 3, so as to establish the gear position thus determined.

The rotation control of the stator wheel 6s of the torque converter 6 is effected by controlling the clutch Cs, brake Bs and the electric motor 10. More specifically, the rotation of the stator wheel 6s is controlled by suitably adjusting the driving torque $T_D$ proportional to the magnitude of the driving current $I_D$ supplied to the electric motor 10 from an inverter according to a command of the electronic control unit 78, or suitably adjusting the braking torque $T_B$ proportional to the magnitude of the generated current $I_G$ generated from the electric motor 10, for example.

Figure 5:
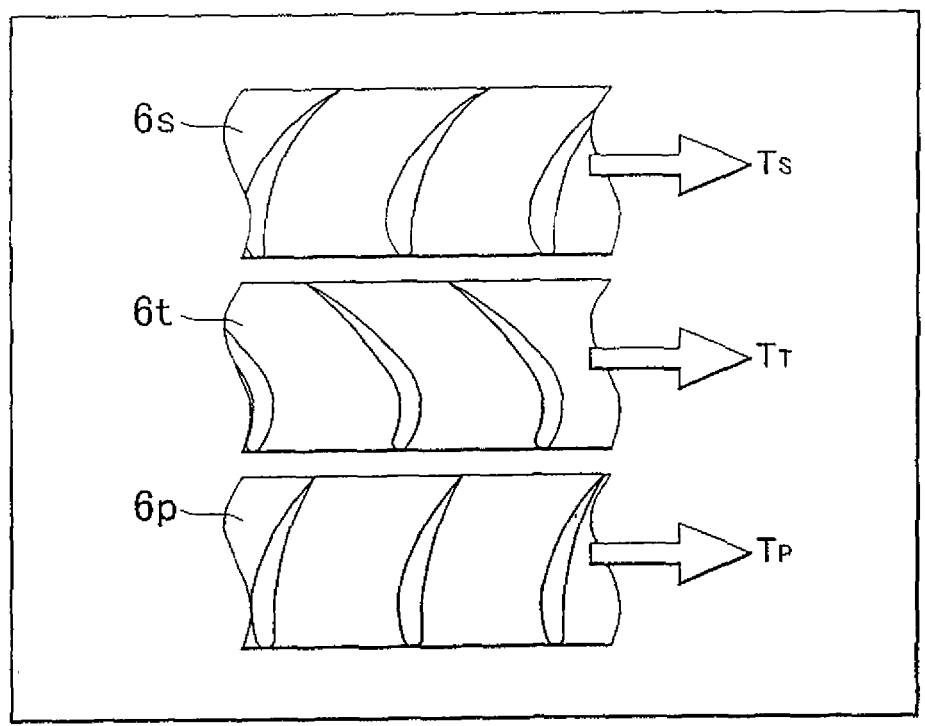
FIG. 5 is a view showing the cross-sectional shapes of vanes of pump impeller, turbine wheel and stator wheel, respectively, along the flow line of hydraulic oil in the torque converter of FIG. 1.

In the torque converter 6 of this embodiment, the hydraulic oil that sticks to the outer radius side under centrifugal force circulates along a flow line FL of FIG. 1 as seen in a section of the torque converter 6, passing the pump impeller 6p, turbine wheel 6t and the stator wheel 6s in this order. As shown in FIG. 5, each of the pump impeller 6p, turbine wheel 6t and the stator wheel 6s includes a plurality of vanes that are spaced at given intervals in the circumferential direction. FIG. 5 shows the shape of the vanes of each of the pump impeller, turbine wheel and stator wheel as viewed along the flow line FL of the hydraulic oil in the torque converter 6. In operation, the hydraulic oil that flows by receiving energy from the vanes of the pump impeller 6p acts on the vanes of the turbine wheel 6t so as to rotate the turbine wheel 6t. In a converter region, the hydraulic oil that has passed the turbine wheel 6t hits against the vanes of the stator wheel 6s so that the direction of flow of the hydraulic oil is changed, and then circulates into the pump impeller 6p. When the hydraulic oil hits against the vanes of the stator wheel 6s and its direction is changed, reaction torque is produced at the stator wheel 6s. The reaction torque corresponds to the amount (angle) of change in the direction of flow of the hydraulic oil, and corresponds to the magnitude of the torque ratio t which will be described later.

According to the definition of the angular momentum, torque T [N·m] applied from each of the wheels (the pump impeller 6p, turbine wheel 6t and stator wheel 6s) to the hydraulic oil (fluid) is expressed by the following equation (1).

$$T=(\gamma/g) \times Q \times \Delta(r \times v_U) \quad (1)$$

In the above equation (1), $\gamma$ is the specific weight [kg/m³] of the hydraulic oil in the torque converter 6, g is the gravitational acceleration [m/s²], Q is the volume flow rate [m³/s] of the hydraulic oil, and $\Delta(r \times v_U)$ [m²/s] is a difference in the moment $r \times v_U$ [m²/s] of the absolute velocity of the hydraulic oil at the outlet and inlet of the fluid flow in each wheel.

From the above equation (1), torque $T_1$[N·m] applied from the pump impeller 6p to the hydraulic oil, torque $T_2$[N·m] applied from the turbine wheel 6t to the hydraulic oil, and the torque $T_3$[N·m] applied from the stator wheel 6s to the hydraulic oil are expressed by the following equations (2)-(4), respectively. In the equations (2)-(4), $T_P$ is pump torque [N·m], or engine torque, and $T_T$ is turbine torque [N·m], or output torque, while $T_S$ is stator torque [N·m] that is equal to the magnitude of the reaction torque of the stator wheel 6s, namely, torque applied to the stator wheel 6s in the positive rotational direction as the rotational direction of the pump impeller 6p when the direction of flow of the hydraulic oil is changed by the stator wheel 6s.

$$T_1=T_P=(\gamma/g) \times Q \times (V_{UP} \times r_2 - V_{US} \times r_1) \quad (2)$$

$$T_2=-T_T=(\gamma/g) \times Q \times (V_{UT} \times r_3 - V_{UP} \times r_2) \quad (3)$$

$$T_3=T_S=(\gamma/g) \times Q \times (V_{US} \times r_1 - V_{UT} \times r_3) \quad (4)$$

In the above equations (2) through (4), $r_1$ is the distance [m] from the axis of rotation, i.e., the input shaft (turbine shaft) 22 of the automatic transmission 8 to the outlet bp of the fluid flow of the pump impeller 6p and the inlet at of the fluid flow of the turbine wheel 6t, and $r_2$ is the distance [m] from the axis of rotation to the outlet bt of the fluid flow of the turbine wheel 6t and the inlet as of the fluid flow of the stator wheel 6s, while $r_3$ is the distance from the axis of rotation to outlet bs of the fluid flow of the stator wheel 6s and the inlet ap of the fluid flow of the pump impeller 6p. In the above equations (2) through (4), $V_{UP}$ is the circumferential velocity (m/s) of the absolute velocity of the pump impeller 6p, and $V_{UT}$ is the circumferential velocity (m/s) of the absolute velocity of the turbine wheel 6t, while $V_{US}$ is the circumferential velocity (m/s) of the absolute velocity of the stator (wheel) 6s.

Since the relationship that $T_1+T_2+T_3=0$ (zero) is satisfied from the above equations (2) through (4), the relationship among the pump torque $T_P$, turbine torque $T_T$ and the stator torque $T_S$ is expressed by the following equation (5). Namely, the stator torque $T_S$ is equal to an increase in torque from the pump torque $T_P$ to the turbine torque $T_T$ in the torque converter 6.

$$T_T=T_P+T_S \quad (5)$$

In the torque converter 6 of this embodiment, the reaction force of the stator wheel 6s is increased or reduced by the driving torque $T_D$ or braking torque $T_B$ that is adjusted by controlling rotation of the electric motor 10 as described above. Therefore, the output torque generated from the turbine wheel is increased or reduced with respect to the output torque obtained in a torque converter having a fixed or constant capacity.

Figure 6:
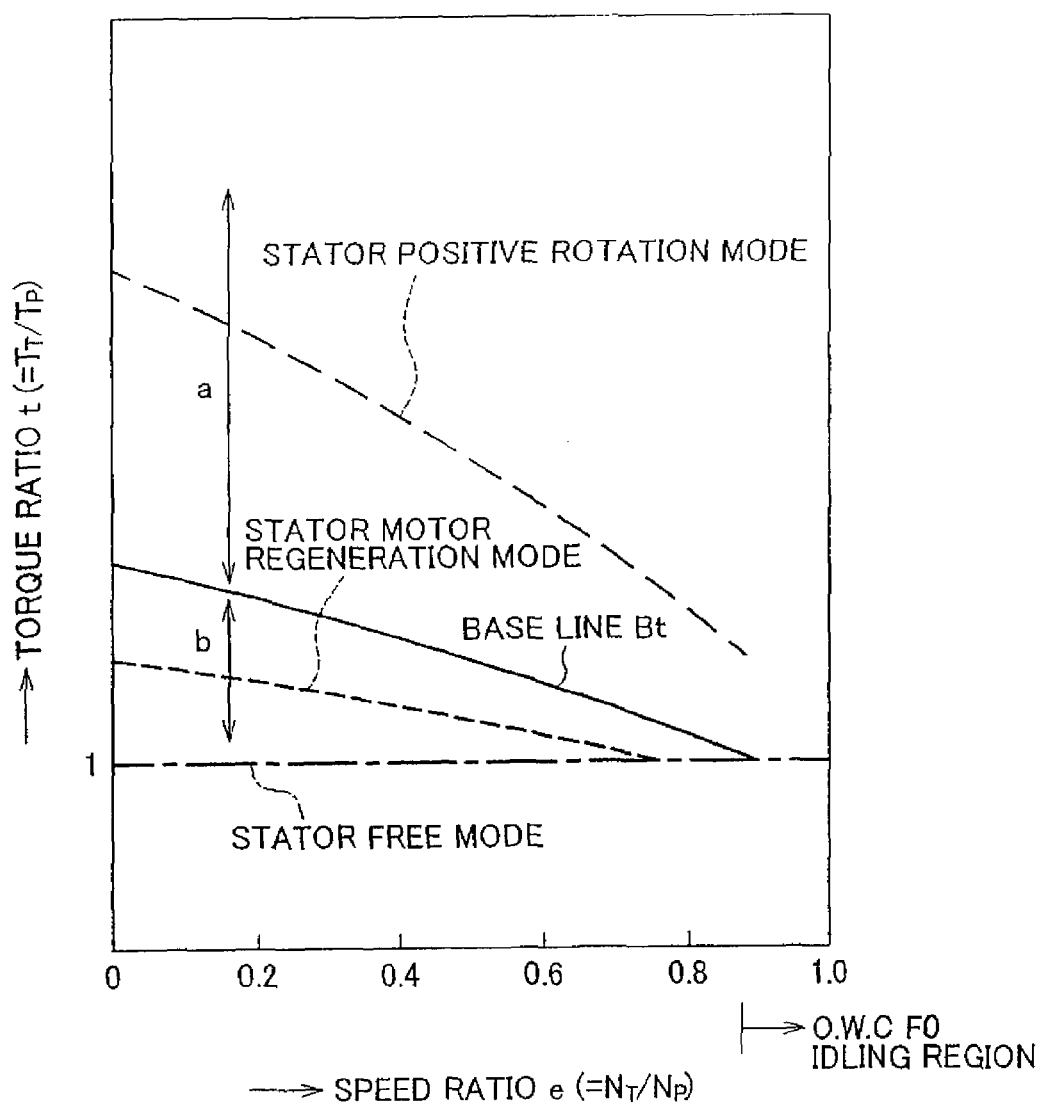
FIG. 6 is a view showing characteristics of the torque converter of FIG. 1, more specifically, relationships between the torque ratio and the speed ratio in different operating modes.
Figure 7:
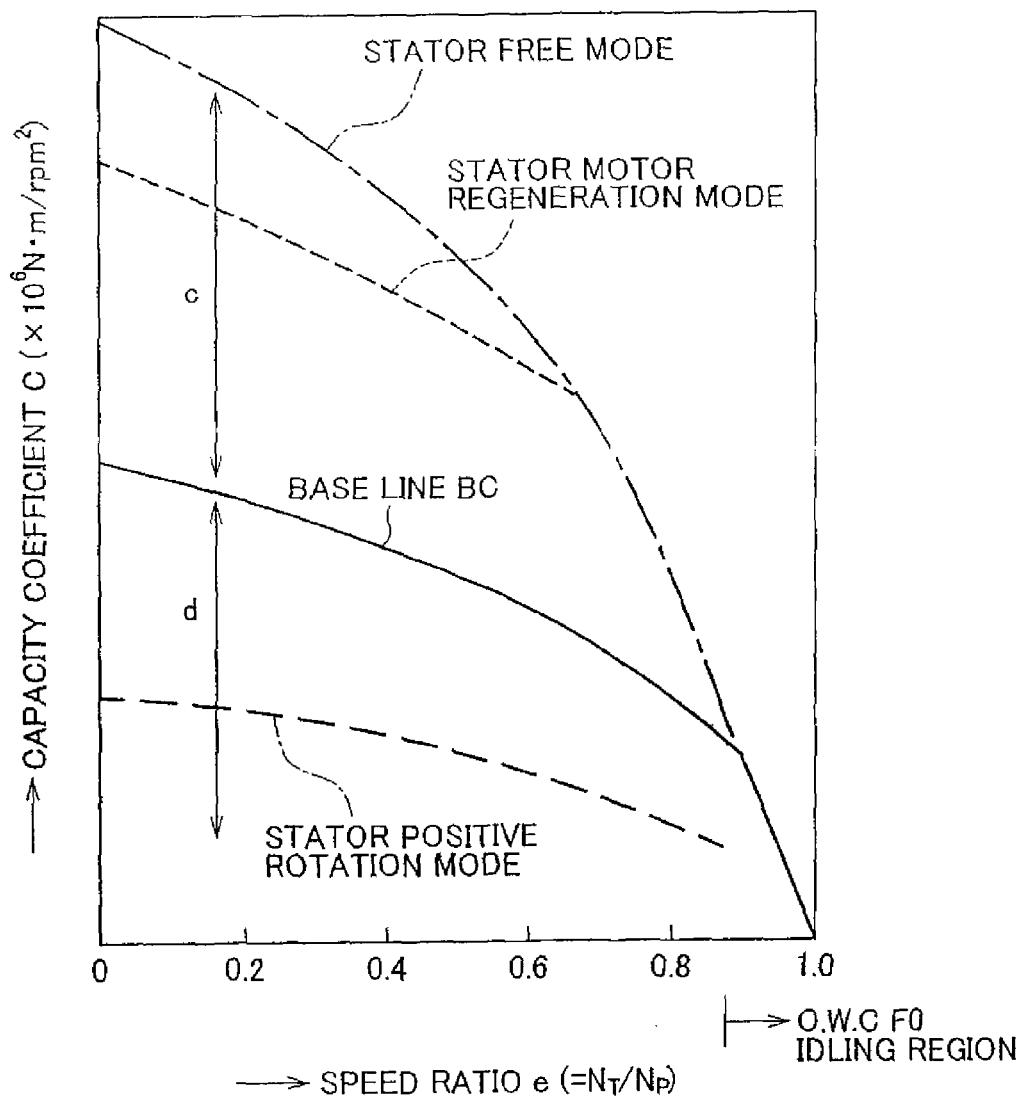
FIG. 7 is a view showing characteristics of the torque converter of FIG. 1, more specifically, relationships between the capacity coefficient and the speed ratio in different operating modes.

FIG. 6 and FIG. 7 show characteristics of the torque converter 6 of this embodiment as described above. FIG. 6 indicates the torque ratio (torque amplification factor) $t(=T_T/T_P)$ of the turbine torque $T_T$ to the pump torque $T_P$, with respect to the rotational speed ratio or speed ratio $e(=N_T/N_P)$ of the turbine speed $N_T$[rpm] of the turbine wheel 6t to the pump speed $N_P$[rpm] of the pump impeller 6p, and FIG. 7 indicates the capacity coefficient $C(=T_P/N_P^2)$[N·m/rpm²] with respect to the speed ratio $e(=N_T/N_P)$.

In FIG. 6 and FIG. 7, when the braking torque $T_B$ is controlled to a given value or the brake Bs is engaged, the stator wheel 6s is fixed to the case 11, and torque is transmitted at a certain torque ratio t that is determined by design as in the torque converter having the fixed capacity, as indicated by a base line Bt represented by the solid line in FIG. 6. In this operating mode, the capacity coefficient C of the torque converter 6 lies on a base line BC represented by the solid line in FIG. 7.

When the driving torque $T_D$ that is controlled to a given value is applied from the electric motor 10 to the stator wheel 6s while the clutch Cs is in an engaged state, so that the stator wheel 6s and the pump impeller 6p are rotated in the same direction, the stator torque $T_S$ increases, and torque is transmitted at a torque ratio t that is larger than that obtained in the torque converter of the fixed capacity, as indicated by the long dashed line in FIG. 6 representing the stator positive rotation mode. In this operating mode, the capacity coefficient C of the torque converter 6 lies on the long dashed line in FIG. 7 representing the stator positive rotation mode. By further increasing or reducing the driving torque $T_D$ by means of the electric motor 10, the torque ratio t and the capacity coefficient C are suitably changed, even with respect to the same speed ratio e, within a range from the base line Bt (FIG. 6) to a point equal to or greater than that on the long dashed line indicating the stator positive rotation mode, as indicated by arrow "a" in FIG. 6, and within a range from the base line BC (FIG. 7) to a point equal to or smaller than that on the long dashed line indicating the stator positive rotation mode, as indicated by arrow "d" in FIG. 7, respectively.

If the clutch Cs and the brake Bs are released so that the stator torque Ts is made equal to zero, torque is not increased but transmitted at a torque ratio t=1, as indicated by the alternate long and short dashed line in FIG. 6 representing the stator free operating mode. As a result, the torque converter 6 operates like a fluid coupling. In this operating mode, the capacity coefficient C of the torque converter 6 lies on the alternate long and short dashed line in FIG. 7 representing the stator free operating mode.

If the braking (regenerative braking) torque $T_B$ of the electric motor 10 is controlled to a given value while the clutch Cs is in the engaged state, or the engaging pressure of the brake Bs is controlled to a given value so that the brake Bs slips, the stator torque $T_S$ is reduced as compared with the case where the stator wheel 6s is fixed, and torque is transmitted at a torque ratio t that is smaller than that obtained in the torque converter of the fixed capacity, as indicated by the short dashed line in FIG. 6 representing the stator motor regeneration mode. In this operating mode, the capacity coefficient C of the torque converter 6 lies on the short dashed line in FIG. 7 representing the stator motor regeneration mode. By further increasing or reducing the braking (regenerative braking) torque $T_B$ or the engaging pressure of the brake Bs, the torque ratio t and the capacity coefficient C are suitably changed, even with respect to the same speed ratio e, within a range from the base line Bt (FIG. 6) to a point on the alternate long and short dashed line indicating the stator free mode, as indicated by arrow "b" in FIG. 6, and within a range from the base line BC (FIG. 7) to a point on the alternate long and short dashed line indicating the stator free mode, as indicated by arrow "c" in FIG. 7, respectively.

Namely, the electric motor 10 of this embodiment is operable to control rotation of the stator wheel 6s in the positive rotational direction as the rotational direction of the pump impeller 6p, thereby to increase the torque ratio t and reduce the capacity coefficient C. Also, the electric motor 10 of this embodiment is operable through its driving or braking (regenerative braking) to control rotation of the stator wheel 6s in the negative rotational direction opposite to the rotational direction of the pump impeller 6p, thereby to reduce the torque ratio t and increase the capacity coefficient C. Furthermore, the brake Bs of this embodiment is operable, when it slips, to control rotation of the stator wheel 6s in the negative rotational direction opposite to the rotational direction of the pump impeller 6p, thereby to reduce the torque ratio t and increase the capacity coefficient C.

Also, the driving/regeneration control of the input shaft 22 is effected by means of the clutch Ci and the electric motor 10. More specifically, the driving/regeneration control of the input shaft 22 is carried out by suitably controlling the driving torque $T_P$ proportional to the magnitude of the driving current $I_P$ supplied from the inverter to the electric motor 10 according to a command of the electronic control unit 78, or controlling the braking (regenerative braking) torque $T_B$ proportional to the magnitude of the generated current $I_G$ generated from the electric motor 10, for example, while the clutch Ci is placed in the engaged state.

As is understood from the above description, the vehicular power transmitting system 7 is arranged to change its mode of running the vehicle as appropriate, by selectively engaging the clutches Cs, Ci and the brake Bs. More specifically, the power transmitting system 7 is placed in a mode in which the capacity of the torque converter 6 can be controlled to be variable when the clutch Cs is engaged, and is placed in a mode in which the driving or regenerative braking of the vehicle can be controlled by means of the electric motor 10 when the clutch Ci is engaged. Also, when the brake Bs is engaged and the stator wheel 6s is brought into a stopped state (i.e., is inhibited from rotating), the power transmitting system 7 is placed in a mode in which the torque converter operates with its capacity coefficient C unchanged or invariable.

Figure 8:
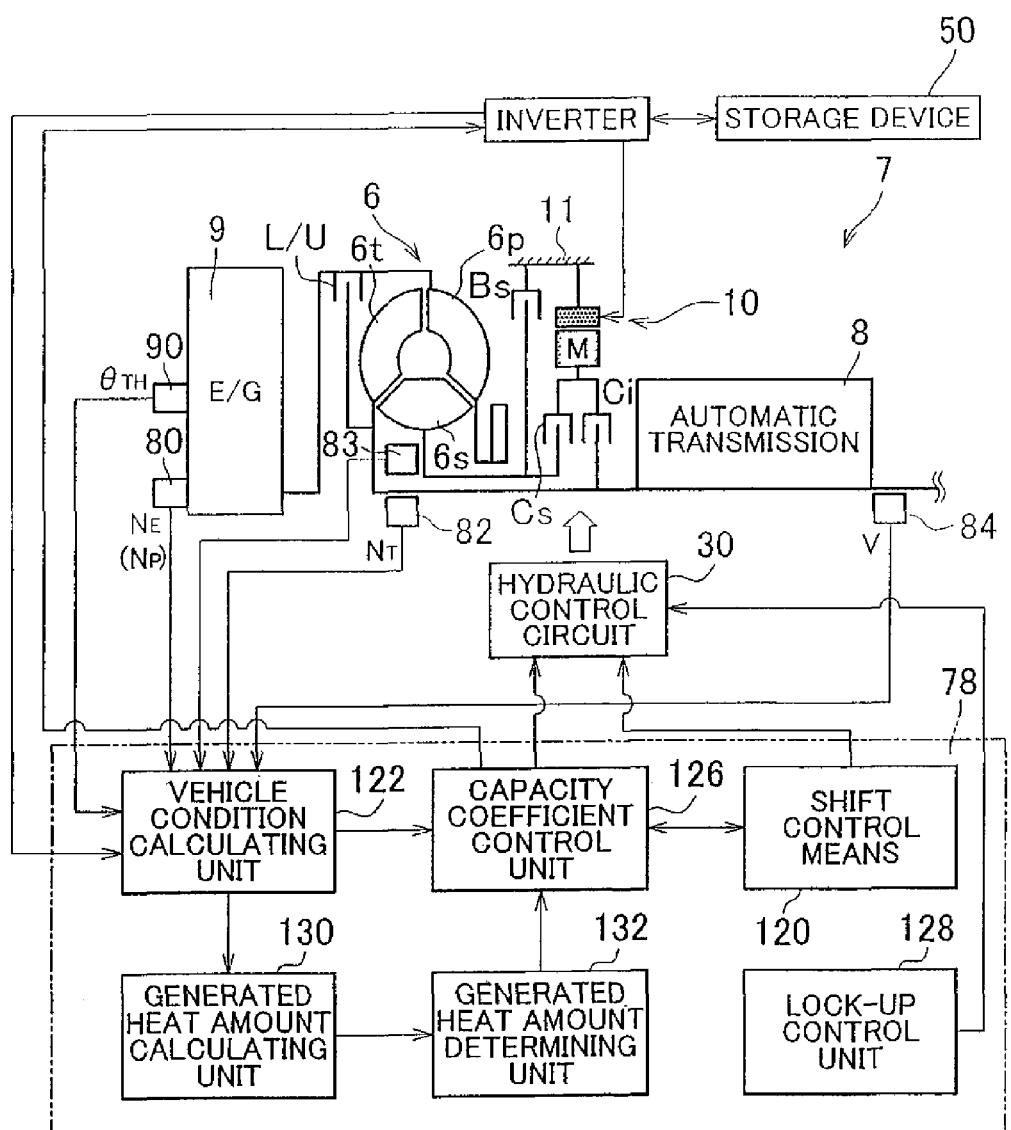
FIG. 8 is a functional block diagram illustrating a principal part of control functions of an electronic control unit that functions as a running control device for a vehicle having the torque converter of FIG. 1.

FIG. 8 is a functional block diagram illustrating a principal part of control functions performed by the electronic control unit 78. A shift control unit 120 functions as a controller for effecting shifting of the automatic transmission 8. The shift control unit 120 determines a gear position to which the automatic transmission 8 is to be shifted, from a shift diagram stored in advance for example, based on the actual vehicle speed V and the throttle opening $\theta_{TH}$ (or accelerator pedal stroke Acc) that represents the required output of the engine 9. Then, the shift control unit 120 generates a shift command to the hydraulic control circuit 30, so as to establish the gear position thus determined.

A vehicle condition calculating unit 122 calculates values indicating vehicle conditions, such as engine torque $T_E$ and the speed ratio e, torque ratio t and capacity coefficient C of the torque converter 6, based on the engine speed $N_E$ (pump speed $N_P$), turbine speed $N_T$, stator speed $N_S$, vehicle speed V corresponding to the output shaft speed $N_{OUT}$, throttle opening $\theta_{TH}$, and so forth.

More specifically, the vehicle condition calculating unit 122 calculates the actual engine torque $T_E$ based on the actual throttle opening $\theta_{TH}$ and the engine speed $N_E$, from an empirically obtained and stored relationship, called torque map, between the engine torque $T_E$ and the engine speed $N_E$, using the throttle opening $\theta_{TH}$ as a parameter.

The vehicle condition calculating unit 122 also calculates the actual speed ratio e of the torque converter 6 from a preset relationship ($e=N_T/N_E$), based on the actual turbine speed $N_T$ and the actual engine speed $N_E$. The vehicle condition calculating unit 122 also calculates the actual capacity coefficient C based on the actual speed ratio $e(=N_T/N_E)$ and the stator speed $N_S$, from a relationship (map) set based on the shapes of the vanes of the pump impeller 6p, turbine wheel 6t and stator wheel 6s, speed ratio e, stator speed $N_S$, etc.

The vehicle condition calculating unit 122 also calculates the actual torque ratio t based on the calculated actual speed ratio e and capacity coefficient C, from an empirically obtained and stored relationship (map) among the torque ratio t, speed ratio e and capacity coefficient C of the torque converter 6.

A capacity coefficient control unit 126 causes the electric motor 10 to control rotation of the stator wheel 6s, namely, rotate the stator wheel 6s in the positive direction or reverse direction or (regeneratively) brake the stator wheel 6s, thereby to suitably control the capacity coefficient C in accordance with the running conditions of the vehicle. In another operating mode, the capacity coefficient control unit 126 controls rotation of the stator wheel 6s by changing the engaging pressure of the brake Bs, thereby to suitably control the capacity coefficient C in accordance with the running conditions of the vehicle.

More specifically, when the vehicle is started or accelerated, for example, the capacity coefficient control unit 126 controls the hydraulic control circuit 30 to engage the clutch Cs, and causes the electric motor 10 to rotate the stator wheel 6s in the same rotational direction as the pump impeller 6p. As a result, the torque ratio t of the torque converter 6 is increased, and the capacity coefficient C is reduced. Consequently, torque for starting the vehicle or torque for accelerating the vehicle increases with the increase in the torque ratio t, and the engine speed can be smoothly raised due to the reduction in the capacity coefficient C. This control is effectively executed when the vehicle is in an acceleration-oriented running mode (for improved power performance), such as when the accelerator pedal is operated by a large degree. In particular, this control is effectively implemented in a turbo charged engine, or the like, in which the engine speed is required to be increased more smoothly.

The capacity coefficient control unit 126 may also control the hydraulic control circuit 30 to engage the clutch Cs, and cause the electric motor 10 to be rotated by torque applied to the stator wheel 6s. Namely, the capacity coefficient control unit 126 controls the amount of electrical energy regenerated or recovered by the electric motor 10 when it is rotated in the negative rotational direction opposite to the rotational direction of the pump impeller 6p by torque or reaction torque which the stator wheel 6s receives from the fluid flow. As a result, the torque ratio t of the torque converter 6 is reduced, and the capacity coefficient C is increased. This control is effectively executed when the vehicle is in a running mode aiming at reduced fuel consumption (or higher fuel efficiency), such as when the accelerator pedal is operated by a small degree. In this case, the fuel efficiency fuel economy is improved due to the regenerative operation of the electric motor 10.

The capacity coefficient control unit 126 may also control the capacity coefficient C so as to change an operating region of the engine 9 to a region having an excellent fuel consumption characteristic. More specifically, since the load on the engine 9 can be changed by changing the capacity coefficient C, the capacity coefficient control unit 126 controls the capacity coefficient C so that the engine 9 is operated in an operating region having an excellent fuel consumption characteristic (for example, in a low-speed high-torque region) with respect to the same required driving force.

The capacity coefficient control unit 126 may also control the capacity coefficient C by controlling the engaging pressure of the brake Bs. For example, the capacity coefficient control unit 126 increases the engaging pressure of the brake Bs to a level at which the brake Bs is completely engaged, in a torque converter range, so as to stop rotation of the stator wheel 6s. As a result, the capacity coefficient C of the torque converter 6 is controlled to be on the base line BC as shown in FIG. 7. The capacity coefficient control unit 126 may also release the brake Bs when the torque converter 6 is brought into a coupling range, so that the stator wheel 6s idles or turns free. Also, when the driving torque needs to be reduced during running of the vehicle, for example; the capacity coefficient control unit 16 controls the engaging pressure of the brake Bs to cause a slip to occur in the brake Bs, thereby to increase the capacity coefficient C.

A lock-up control unit 128 controls engagement and release of the lock-up clutch L/U based on the vehicle speed and the accelerator pedal stroke Acc, according to a lock-up engagement map that is stored in advance. More specifically, the lock-up control unit 128 engages the lock-up clutch L/U and directly couples the pump impeller 6p and the turbine wheel 6t in a relatively high-vehicle-speed region, so as to eliminate a slip loss (internal loss) of the torque converter 6 and improve the fuel efficiency. Also, in a relatively low- and middle-vehicle-speed region, the lock-up control unit 128 executes slip control (flex lock-up control) for engaging the pump impeller 6p with the turbine wheel 6t while providing a certain minute slip between the pump impeller 6p and the turbine wheel 6t, so as to expand a lock-up operating region and improve the transmission efficiency of the torque converter 6. Upon start of the slip control, the lock-up control unit 128 calculates a slip amount (=$N_P-N_T$, or $\omega_P-\omega_T$) as a different in the rotational speed between the pump speed $N_P$ and the turbine speed $N_T$, and controls the engaging pressure of the lock-up clutch L/U so that the slip amount becomes equal to a preset or specified slip amount.

When the slip control of the lock-up clutch L/U is carried out, slipping of the lock-up clutch L/U causes heat to be generated in the lock-up clutch L/U. The amount of heat $Q_{CL}$(cal/mm$^2$·sec) generated at this time increases in proportion to the torque applied to the lock-up clutch L/U and the slip amount. In a running region in which the lock-up clutch L/U generates a large amount of heat, the slip control of the lock-up clutch L/U is inhibited in order to avoid reduction in the durability of the lock-up clutch L/U due to the heat generated.

Figure 9:
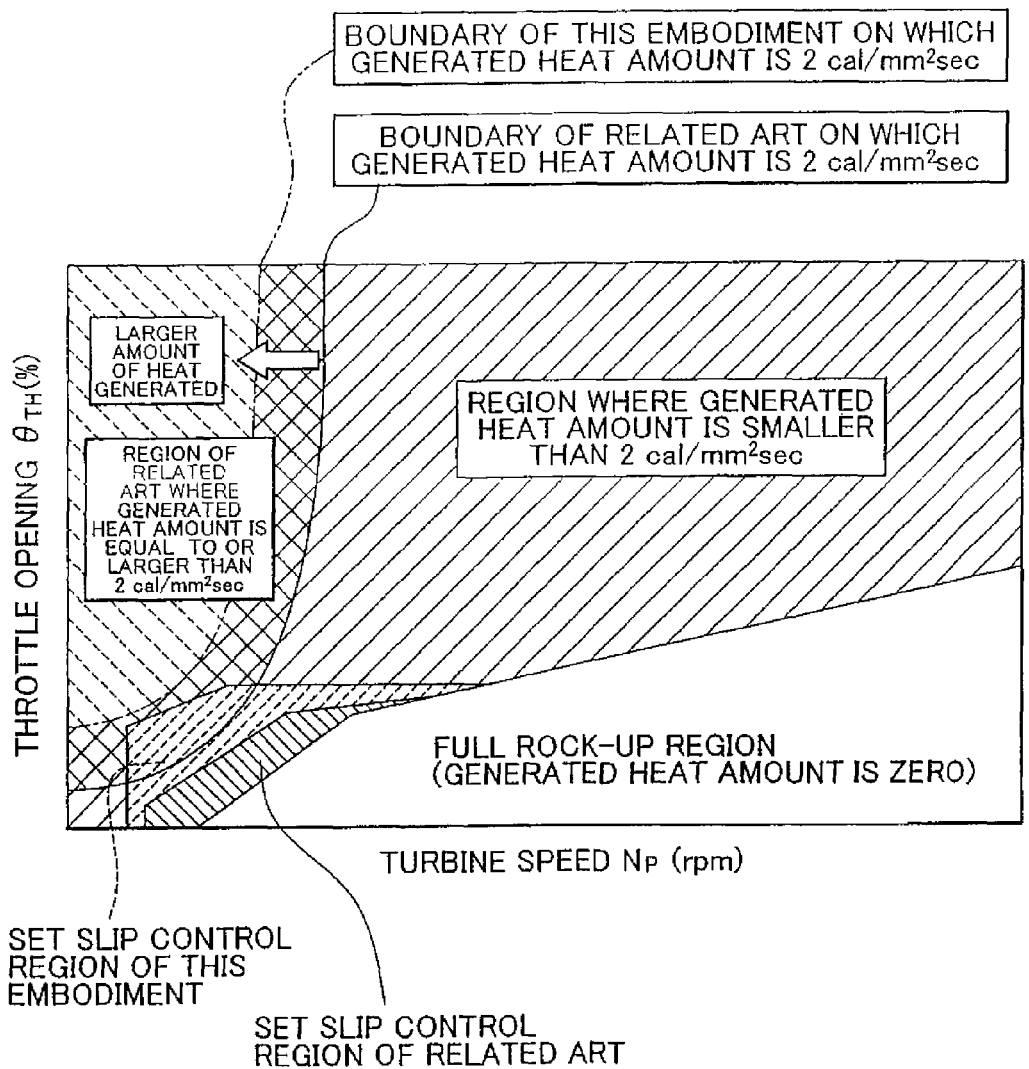
FIG. 9 is a generated heat amount distribution chart showing the result of analytical calculation of the amount of heat generated during slip control of the lock-up clutch.

FIG. 9 is a heat amount distribution chart showing the result of analytical calculation of the amount of heat $Q_{CL}$(cal/mm$^2$·sec) generated during slip control of the lock-up clutch L/U. In the distribution chart of FIG. 9, the horizontal axis indicates the turbine speed $N_T$, and the vertical axis indicates the throttle opening $\theta_{TH}$ (substantially equivalent to the engine torque $T_E$). The heat amount distribution chart of FIG. 9 is plotted by calculating the amount of heat with respect to a preset or predetermined slip amount. When the turbine wheel 6t is in a high rotational speed range, the torque converter 6 is in a full lock-up region (i.e., the lock-up clutch L/U is fully or completely engaged) as in the actual running of the vehicle, in which the slip amount is equal to zero, and therefore the amount of heat $Q_{CL}$ is equal to zero. As shown in FIG. 9, the generated heat amount $Q_{CL}$ increases as the operating point approaches a low-speed high-load running region (an upper, left region in FIG. 9). Accordingly, a slip control region is set in view of the actual running region and the generated heat amount $Q_{CL}$, to a set slip control region of the related art, which is set adjacent to the full lock-up region and is indicated by a hatched area with solid lines in FIG. 9. In this embodiment, a region in which the generated heat amount $Q_{CL}$ exceeds 2(cal/mm$^2$·sec) is regarded as a region in which the durability of the lock-up clutch L/U is reduced. Therefore, the slip control region is set so as to avoid the region(s) in which the generated heat amount $Q_{CL}$ exceeds 2(cal/mm$^2$·sec).

If the slip control region is expanded, the slip loss of the lock-up clutch L/U is reduced, and the fuel efficiency is improved. However, there is a limit to the expansion of the slip control region in view of the generated heat amount $Q_{CL}$ as described above. The slip control region may be expanded by reducing the slip amount to thereby prevent the generated heat amount $Q_{CL}$ from increasing. If the slip amount is reduced, however, the torque converter 6 is less likely to produce its inherent vibration damping effect, resulting in a problem of increase of booming noise.

On the other hand, the capacity coefficient control unit 126 is configured to reduce the generated heat amount $Q_{CL}$, by increasing the capacity coefficient C of the torque converter 6 based on the amount $Q_{CL}$ of heat generated during slip control of the lock-up clutch L/U. Accordingly, the slip control can be implemented even in a region where the generated heat quantity $Q_{CL}$ was so large that slip control could not be implemented in the related art. This control will be hereinafter described in detail.

Referring back to FIG. 8, a generated heat amount calculating unit 130 initially calculates assigned torque $T_{CL}$ assigned to the lock-up clutch L/U, which torque is to be transferred by the lock-up clutch L/U, from the engine torque $T_E$ of the engine 9 (input torque) and transmitted torque of the torque converter 6, and calculates the generated heat amount $Q_{CL}$ based on the assigned torque $T_{CL}$ and the slip amount ($=N_P-N_T$, or $\omega_P-\omega_T$) of the lock-up clutch L/U. The amount $Q_{CL}$(cal/mm²·sec) of heat generated per unit area of the lock-up clutch L/U is calculated according to the following equation (6).

$$Q_{CL}=(1/A_{CL})\cdot((\omega_E-\omega_T)\times(T_E-C\cdot N_E^2)) \qquad (6)$$

In the above equation (6), $A_{CL}$ denotes the contact area of the lock-up clutch L/U during slip control thereof, and $\omega_E$ denotes the angular velocity (rad/see) of the engine 8, while $\omega_T$ denotes the angular velocity (rad/sec) of the turbine wheel 6t. In the above equation (6), the assigned torque $T_{CL}$ of the lock-up clutch L/U is represented by $(T_E-CN_E^2)$, and the slip amount is represented by $(\omega_E-\omega_T)$. It is thus understood from the above equation (6) that the generated heat amount $Q_{CL}$ increases as the torque $T_{CL}$ and the slip amount increase. The generated heat amount calculating unit 130 calculates the generated heat amount $Q_{CL}$, according to the above-indicated equation (6).

A generated heat amount determining unit 132 determines whether the generated heat amount $Q_{CL}$ calculated by the generated heat amount calculating unit 130 is equal to or smaller than a predetermined value Q1 that is set in advance. Here, the predetermined value Q1 is determined in view of the durability of the lock-up clutch L/U, and may be set via a durability test, or the like, conducted on the lock-up clutch L/U. More specifically, the predetermined value Q1 is set, based on the durability test for example, to a threshold value at which the available use time of the lock-up clutch L/U for which the lock-up clutch L/U can be used exceeds a preset life time thereof. Namely, if the generated heat amount $Q_{CL}$ exceeds the predetermined value Q1, the available use time of the lock-up clutch. L/U is reduced to be shorter than the life time.

Then, the capacity coefficient control unit 126 controls the capacity coefficient C so that the amount $Q_{CL}$ of heat generated during slip control of the lock-up clutch L/U becomes equal to or smaller than the predetermined value Q1. More specifically, if the generated heat amount determining unit 132 determines that the generated heat amount $Q_{CL}$ calculated by the generated heat amount calculating unit 130 exceeds the predetermined value Q1, the capacity coefficient control unit 126 executes control for increasing the capacity coefficient C. As the capacity coefficient C increases, the assigned torque $T_{CL}$ to be transferred by the lock-up clutch L/U decreases according to the above equation (6), and therefore, the generated heat amount $Q_{CL}$, is reduced.

Where the capacity coefficient C is to be increased, the clutch Cs is placed in an engaged state in which the stator wheel 6s can be controlled by the electric motor 10, and the stator wheel 6s is driven by the electric motor 10 in the reverse direction so that the capacity coefficient C is increased. The capacity coefficient C may also be increased by reducing the braking (regenerative braking) torque of the electric motor 10 and rotating the stator wheel 6s in the reverse direction while the clutch Cs is in the engaged state. Thus, the capacity coefficient C is increased by either of the above methods by causing the electric motor 10 to rotate the stator wheel 6s in the reverse direction. In addition, the capacity coefficient C may also be increased by reducing the torque capacity of the brake Bs while the brake Bs is in an engaged state, and rotating the stator wheel 6s in the reverse direction.

Figure 10:
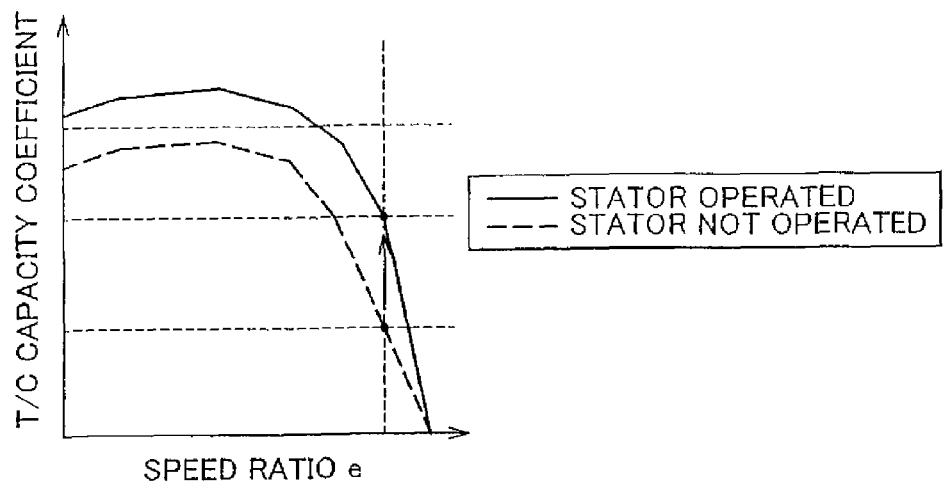
FIG. 10 is a view which corresponds to FIG. 7 indicating the capacity coefficient with respect to the speed ratio, and which shows increase of the capacity coefficient when the stator wheel is rotated in a reverse direction.

FIG. 10, which corresponds to FIG. 7 indicating the capacity coefficient C with respect to the speed ratio e, shows increase of the capacity coefficient C when the stator wheel 6s is rotated in the reverse direction. In FIG. 10, the dashed line indicates the capacity coefficient C of the torque converter of the related art in which the stator wheel 6s is coupled to a stationary member via a one-way clutch, and the solid line indicates the capacity coefficient C of the torque converter 6 of this embodiment when the stator wheel 6s is rotated in the reverse direction. If the stator wheel 6s is rotated in the reverse direction, the capacity coefficient C is increased with respect to the same speed ratio e as indicated by the solid arrow in FIG. 10. The relationship between the capacity coefficient C, and the speed ratio e and the stator speed $N_S$ of the stator wheel 6s is obtained in advance by experiment or analysis, and stored as a map as shown in FIG. 10 by way of example. The generated heat amount calculating unit 130 determines the capacity coefficient C according to the map, and calculates the generated heat amount $Q_{CL}$.

Figure 11:
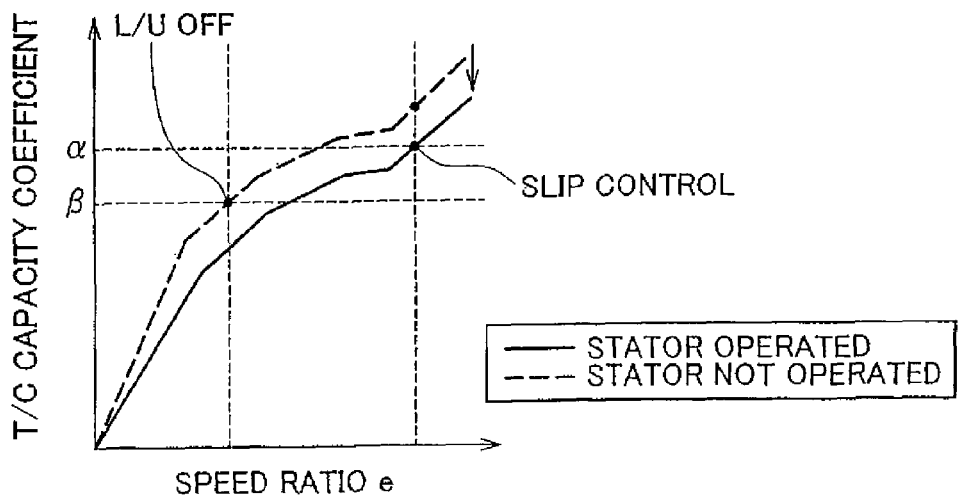
FIG. 11 is a view indicating the efficiency of the torque converter when the stator wheel is rotated in the reverse direction.

FIG. 11 shows the efficiency of the torque converter 6 when the stator wheel 6s is rotated in the reverse direction. If the stator wheel 6s is rotated in the reverse direction, the assigned torque $T_{CL}$ to be transferred by the lock-up clutch L/U decreases as the capacity coefficient C increases as shown in FIG. 10, whereas the transmitted torque that is transmitted to the torque converter 6 increases in relation to the torque $T_{CL}$. Accordingly, a loss caused by slipping of the torque converter 6 increases, and the efficiency of the torque converter 6 is reduced as the capacity coefficient C increases. In other words, if the capacity coefficient C is increased, the generated heat amount $Q_{CL}$ is reduced, but the efficiency of the torque converter 6 is reduced. However, if the efficiency a of the torque converter 6 under slip control and the torque converter efficiency 13 of the torque converter 6 when the lock-up clutch L/U is in a non-operating (OFF) state are compared with each other when the same engine torque $T_5$ is applied to the torque converter 6, as shown in FIG. 11, the efficiency a of the torque converter 6 under slip control is improved since the slip loss is sufficiently reduced. It is to be noted that the speed ratio $e(=N_T/N_P)$ is larger during slip control than that obtained when the lock-up clutch L/U is in the OFF state with respect to the same engine torque $T_E$, since the relative rotational speed between the pump speed $N_P$ and the turbine speed $N_T$ is reduced during slip control.

It will be understood from the above description that the generated heat amount $Q_{CL}$ can be reduced to be equal to or smaller than the predetermined value Q1 by increasing the capacity coefficient C, even in a region in which the generated heat amount $Q_{CL}$ exceeds the predetermined value Q1 in the related art. In other words, the slip control region can be expanded as the generated heat amount $Q_{CL}$ decreases. For example, by increasing the capacity coefficient C so as to reduce the generated heat amount $Q_{CL}$, a boundary (solid line in FIG. 9) on which the generated heat amount $Q_{CL}$ is equal to 2(cal/mm²·sec) corresponding to the predetermined value Q1 in the torque converter of the related art is shifted to a boundary indicated by the alternate long and short dashed line, as shown in FIG. 9, and the region in which the generated heat amount $Q_{CL}$ is less than 2(cal/mm²·sec) is expanded. Namely, the region in which the generated heat amount $Q_{CL}$ is less than 2(cal/mm²·sec) is expanded or increased by the double-hatched region in FIG. 9. Accordingly, the slip control region can be set which further includes a running region that is hatched with dashed lines in FIG. 9.

Figure 12:
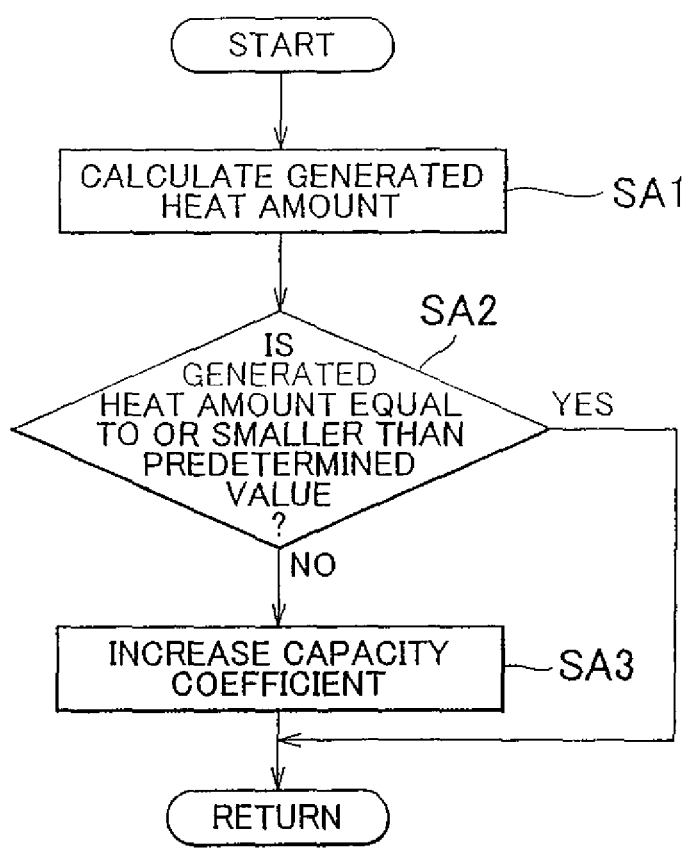
FIG. 12 is a flowchart illustrating a principal part of control operations of the electronic control unit of FIG. 4, namely, a control operation for reducing the amount of heat generated during slip control of the lock-up clutch.

FIG. 12 is a flowchart illustrating a principal part of control operations of the electronic control unit 78, namely, a control operation for expanding the slip control region by reducing the amount $Q_{CL}$ of heat generated during slip control of the lock-up clutch L/U. The control operation or routine is repeatedly executed at a short cycle time or intervals of several milliseconds to several tens of milliseconds, for example.

Initially, in step SA1 corresponding to the generated heat amount calculating unit 130, the amount $Q_{CL}$ of heat generated during slip control of the lock-up clutch L/U is calculated. Then, in step SA2 corresponding to the generated heat amount determining unit 132, it is determined whether the generated heat amount $Q_{CL}$ calculated in step SA1 is equal to or smaller than the predetermined value Q set in advance. If an affirmative decision (YES) is obtained in step SA2, it is determined that control for reducing the generated heat amount $Q_{CL}$ is not necessary, and the routine of FIG. 12 ends. If a negative decision (NO) is obtained in step SA2, the capacity coefficient C is increased until the generated heat amount $Q_{CL}$ becomes equal to or smaller than the predetermined value Q1 in step SA3 corresponding to the capacity coefficient control unit 126. More specifically, the capacity coefficient C is increased by, for example, causing the electric motor 10 to rotate the stator wheel 6s in the reverse direction. Then, the control returns to step SA1, and the control as described above is repeatedly carried out until the slip control is finished. In this manner, the generated heat amount $Q_{CL}$ is controlled to be equal to or smaller than the predetermined value Q1, so that the slip control region can be expanded.

As described above, according to this embodiment, the capacity coefficient control unit 126 increases the capacity coefficient C of the torque converter 6, based on the amount $Q_{CL}$ of heat generated during slip control of the lock-up clutch L/U, so as to reduce the assigned torque $T_{CL}$ to be transferred by the lock-up clutch L/U and suppress or avoid increase of the generated heat amount $Q_{CL}$ of the lock-up clutch L/U. Accordingly, the slip control can be implemented even in a running region in which the slip control was unable to be implemented in the related art as the generated heat amount $Q_{CL}$, of the lock-up clutch L/U increases. Thus, the running region in which the slip control is implemented can be expanded, thus assuring improved fuel efficiency.

According to the above-described embodiment of the invention, the generated heat amount calculating unit 130 is provided for calculating the amount $Q_{CL}$ of heat generated during slip control of the lock-up clutch L/U, and the capacity coefficient control unit 126 controls the capacity coefficient C so that the generated heat amount thus calculated becomes equal to or smaller than the predetermined value Q1. With the generated heat amount $Q_{CL}$, thus controlled (reduced), the slip control region can be expanded.

According to the above-described embodiment, the generated heat amount calculating unit 130 calculates the assigned torque $T_{CL}$ to be transferred by the lock-up clutch L/U, from the input torque $T_E$ of the engine 9 and the transmitted torque of the torque converter 6, and calculates the generated heat amount $Q_{CL}$ based on the assigned torque $T_{CL}$ and the slip amount of the lock-up clutch L/U. Thus, the generated heat amount calculating unit 130 is able to sequentially calculate the generated heat amount $Q_{CL}$ of the lock-up clutch L/U with high accuracy.

According to the above-described embodiment, the predetermined value Q1 is set to an appropriate value in view of the durability of the lock-up clutch L/U. It is thus possible to expand the slip control region of the lock-up clutch L/U while avoiding reduction in the durability of the lock-up clutch L/U.

According to the above-described embodiment, the capacity coefficient control unit 126 controls the capacity coefficient C by controlling rotation of the stator wheel 6s, by means of the electric motor 10 that is coupled to the stator wheel 6 such that power can be transmitted to the stator wheel 6s. With this arrangement, the capacity coefficient C can be changed as desired through control of the rotational speed by the electric motor 10.

While one embodiment of the invention has been described in detail with reference to the drawings, the invention may be applied otherwise or embodied in other forms.

For example, the construction of the automatic transmission 8 is not limited to that of the illustrated embodiment, and there are no particular limitations to the number of the planetary gear sets or the engaging elements (friction devices), such as the clutches C1-C4 and brakes B1, B2, the number of gear positions, and the elements of the planetary gear sets to which the respective engaging elements are selectively coupled, for example, Also, the present invention is applicable to vehicles of, for example, FF type, 4WD type, and other drive types. The present invention is also applicable to a hybrid vehicle, such as THS, in which an electric motor, or the like, is provided for driving drive wheels. The automatic transmission 8 is not limited to the above-indicated stepped transmission having two or more gear positions, but may be a continuously variable transmission, such as a belt-and-pulley type continuously variable transmission. In sum, the construction of the transmission to which the invention is applied may be freely changed within a reasonable range.

While the electric motor 10 and the stator wheel 6s are directly coupled to each other via the clutch Cs in the illustrated embodiment, a planetary gear set that permits torque conversion may be interposed between the motor 10 and the stator wheel 6.

While the generated heat amount calculating unit 130 sequentially calculates the generated heat amount $Q_{CL}$ according to the above-indicated equation (6) in the illustrated embodiment, the calculating unit 130 may calculate the generated heat amount $Q_{CL}$ based on a preset map indicating the relationship between the generated heat amount $Q_{CL}$, and the engine speed $N_E$, the throttle opening $\theta_{TH}$, and/or other parameter(s).

While the clutch Ci is provided for selectively coupling the electric motor 10 and the input shaft 22 in the illustrated embodiment, the clutch Ci is not necessarily provided, but the invention may be applied to the arrangement in which the clutch Ci is eliminated.

While the stator speed sensor 83 is provided for detecting the stator speed $N_S$ in the illustrated embodiment, the stator speed $N_S$ may be detected with a resolver, or the like, incorporated in the electric motor 10, for example.

While the predetermined value Q1 is set to 2(cal/mm$^2$·sec) by way of example in the illustrated embodiment, this specific numerical value is a mere example, and the predetermined value Q1 may be suitably changed according to, for example, the structure of the lock-up clutch used.

It is to be understood that the illustrated embodiment is merely one embodiment of the invention, and that the invention may be embodied with various changes or improvements, based on the knowledge of those skilled in the art.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A control device for a vehicular power transmitting system including a torque converter having a pump impeller, a turbine wheel, a stator wheel rotatably disposed between the turbine wheel and the pump impeller, and a lock-up clutch, comprising
   a capacity coefficient control unit that controls a capacity coefficient of the torque converter by controlling rotation of the stator wheel, and
   a generated heat amount calculating unit that calculates an amount of heat generated during slip control of the lock-up clutch, wherein
   the capacity coefficient control unit controls the capacity coefficient of the torque converter such that the amount of heat generated during slip control of the lock-up clutch becomes equal to or smaller than a predetermined value.

2. The control device according to claim 1, wherein the generated heat amount calculating unit calculates assigned torque to be transferred by the lock-up clutch, from input torque of a driving source and transmitted torque of the torque converter, and calculates the generated heat amount based on the assigned torque and a slip amount of the lock-up clutch.

3. The control device according to claim 2, wherein the assigned torque is a difference between the input torque and the transmitted torque.

4. The control device according to claim 2, wherein the transmitted torque is determined based on a rotational speed of the pump impeller and the capacity coefficient.

5. The control device according to claim 2, wherein the slip amount is determined based on a difference between a rotational speed of the pump impeller and a rotational speed of the turbine wheel.

6. The control device according to claim 1, wherein the predetermined value is set to a value determined in view of the durability of the lock-up clutch.

7. The control device according to claim 1, wherein the capacity coefficient control unit controls the capacity coefficient by controlling rotation of the stator wheel, using an electric motor that is operatively coupled to the stator wheel such that power can be transmitted between the electric motor and the stator wheel.

8. The control device according to claim 7, wherein the capacity coefficient control unit causes the electric motor to rotate the stator wheel in a reverse direction so as to increase the capacity coefficient of the torque converter.

9. The control device according to claim 7, wherein:
   the vehicular power transmitting system further includes a clutch that selectively couples the stator wheel and the electric motor, and a brake that selectively couples the stator wheel and a non-rotary member; and
   the capacity coefficient control unit controls the clutch and the brake, based on the generated heat amount.

10. The control device according to claim 7, wherein:
    the vehicular power transmitting system further includes a clutch that selectively couples the electric motor and an output shaft of the torque converter; and
    the capacity coefficient control unit controls the clutch based on the generated heat amount.

11. A control device for a vehicular power transmitting system including a torque converter having a pump impeller, a turbine wheel, a stator wheel rotatably disposed between the turbine wheel and the pump impeller, and a lock-up clutch, comprising
    capacity coefficient control means for controlling a capacity coefficient of the torque converter by controlling rotation of the stator wheel, and
    a generated heat amount calculating means for calculating the amount of heat generated during slip control of the lock-up clutch, wherein
    the capacity coefficient control means controls the capacity coefficient of the torque converter such that the amount of heat generated during slip control of the lock-up clutch becomes equal to or smaller than a predetermined value.

12. A method of controlling a vehicular power transmitting system including a torque converter having a pump impeller, a turbine wheel, a stator wheel rotatably disposed between the turbine wheel and the pump impeller, and a lock-up clutch, comprising:
    controlling a capacity coefficient of the torque converter by controlling rotation of the stator wheel;
    calculating an amount of heat generated during slip control of the lock-up clutch, and
    controlling the capacity coefficient of the torque converter such that the amount of heat generated during slip control of the lock-up clutch becomes equal to or smaller than a predetermined value.

* * * * *